April 5, 1960 J. C. KELLY 2,932,015
LOCATING FIXTURE AND METHOD
Filed Dec. 26, 1956 7 Sheets-Sheet 1

INVENTOR.
JOHN C. KELLY
BY
*Whittemore, Hulbert & Belknap*
ATTORNEYS

April 5, 1960
J. C. KELLY
2,932,015
LOCATING FIXTURE AND METHOD
Filed Dec. 26, 1956
7 Sheets-Sheet 2
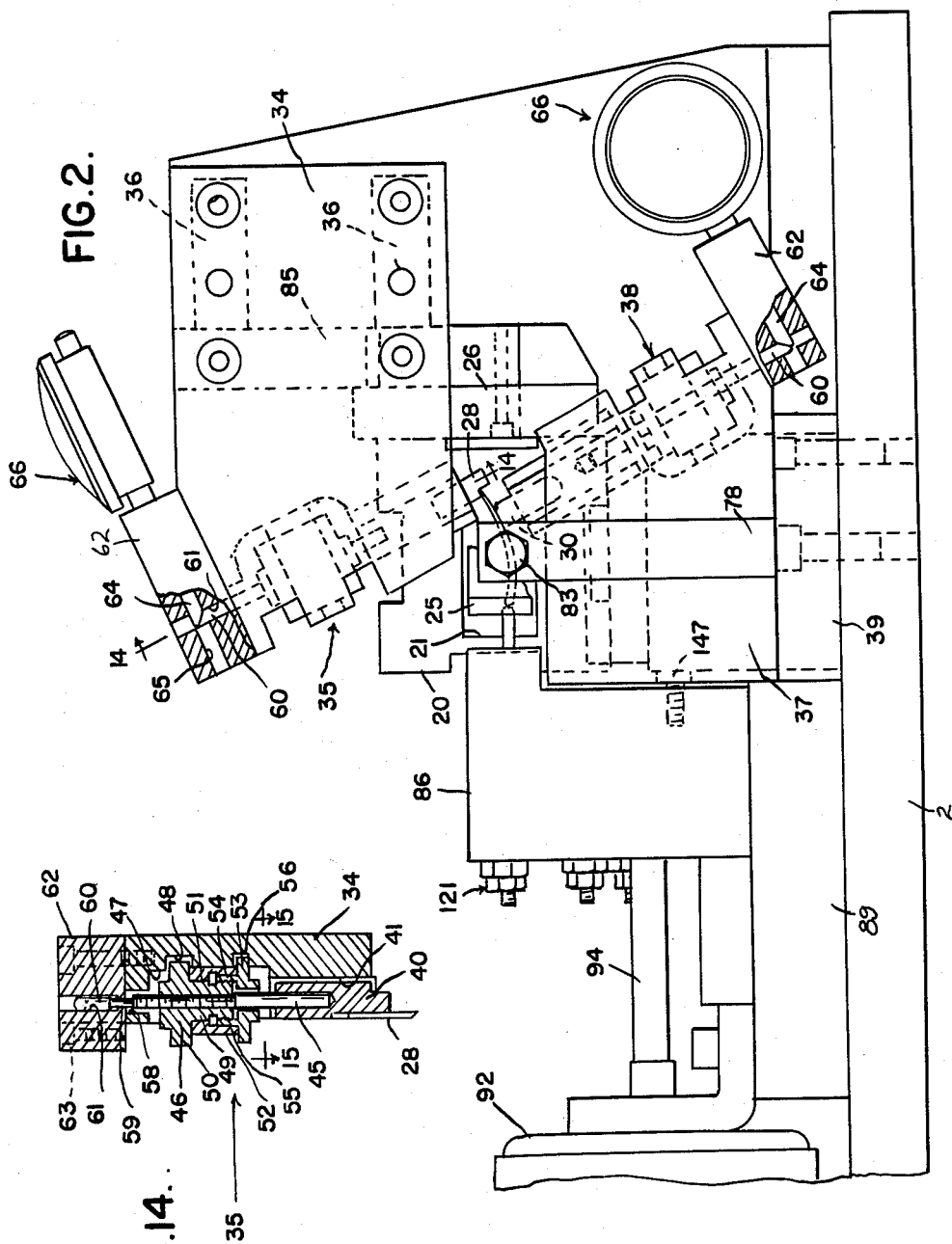
INVENTOR.
JOHN C. KELLY
BY
Whittemore, Hulbert & Belknap
ATTORNEYS

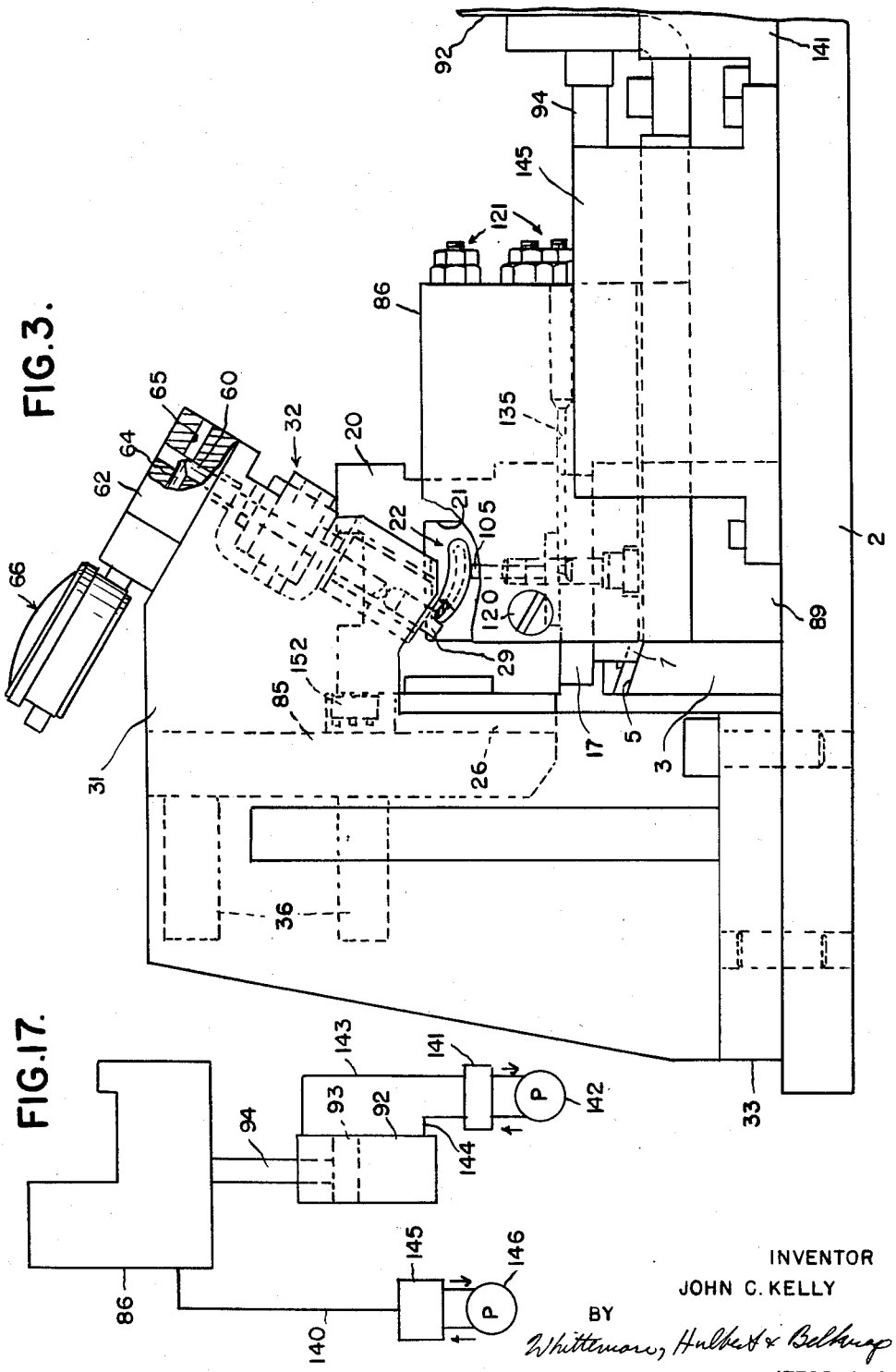

April 5, 1960 J. C. KELLY 2,932,015
LOCATING FIXTURE AND METHOD
Filed Dec. 26, 1956 7 Sheets-Sheet 4
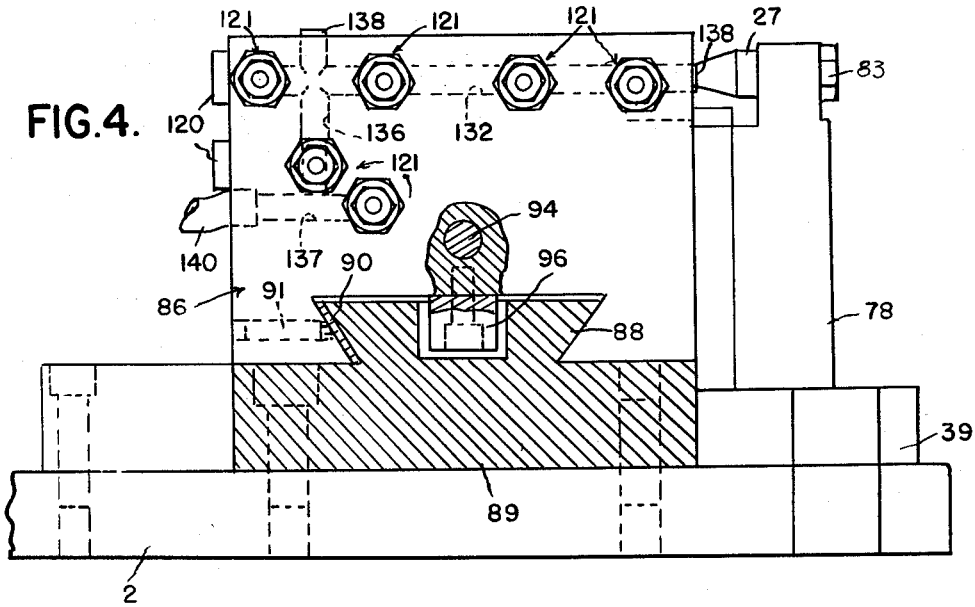
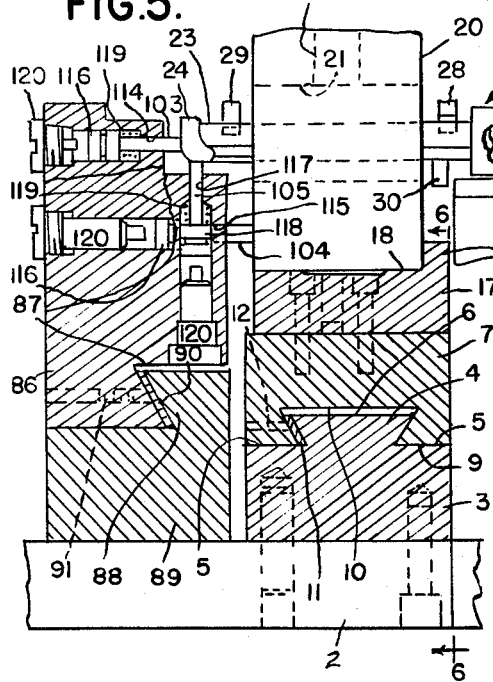
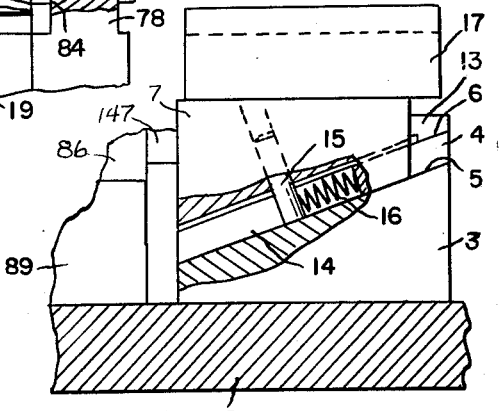
INVENTOR.
JOHN C. KELLY
BY
ATTORNEYS

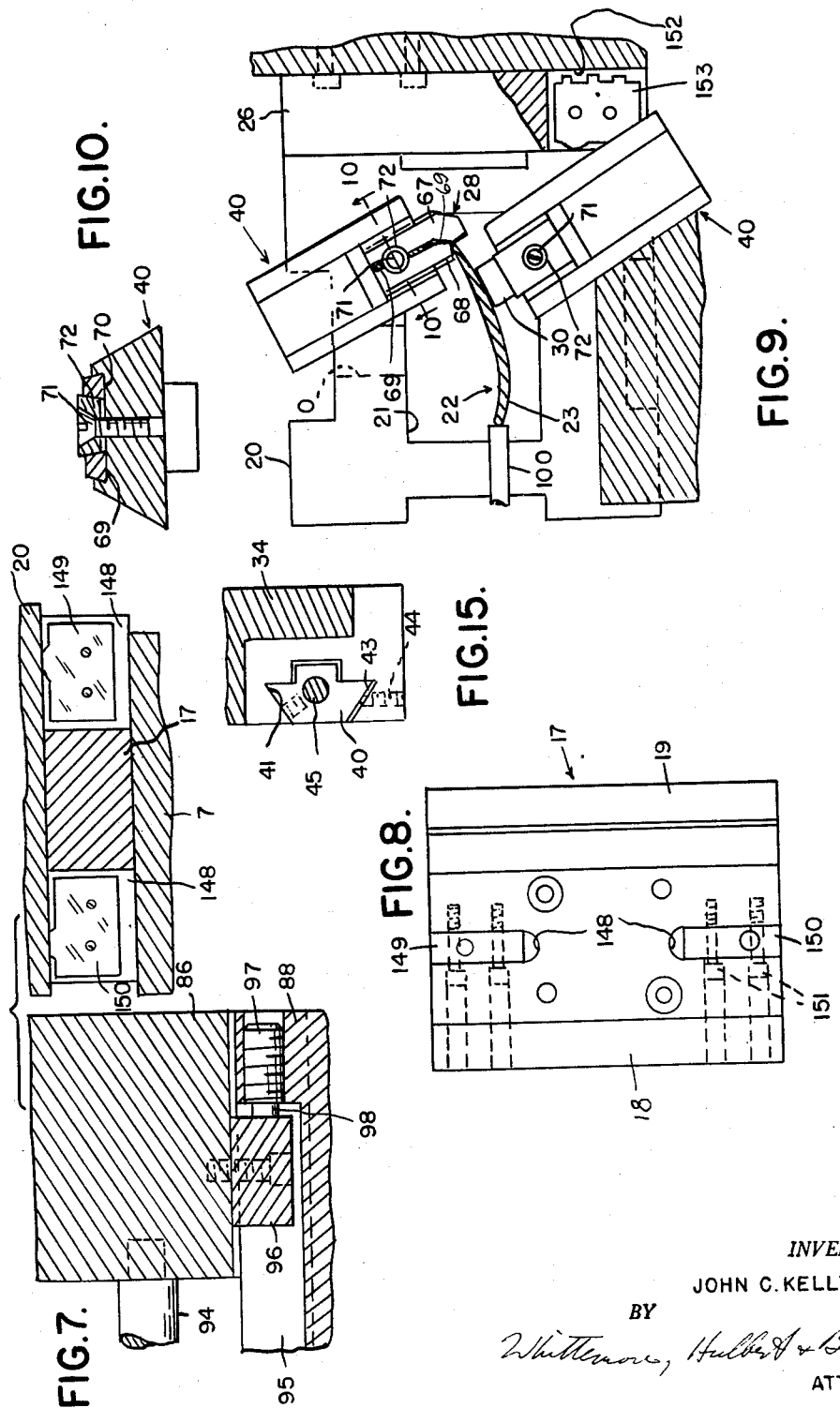

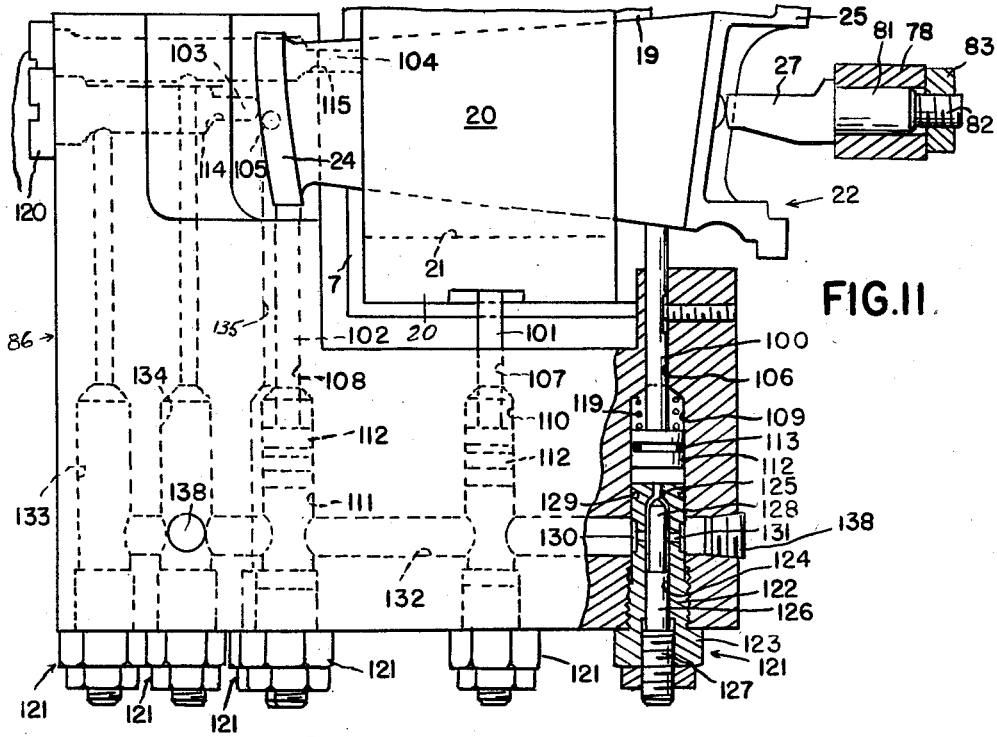
FIG.11.
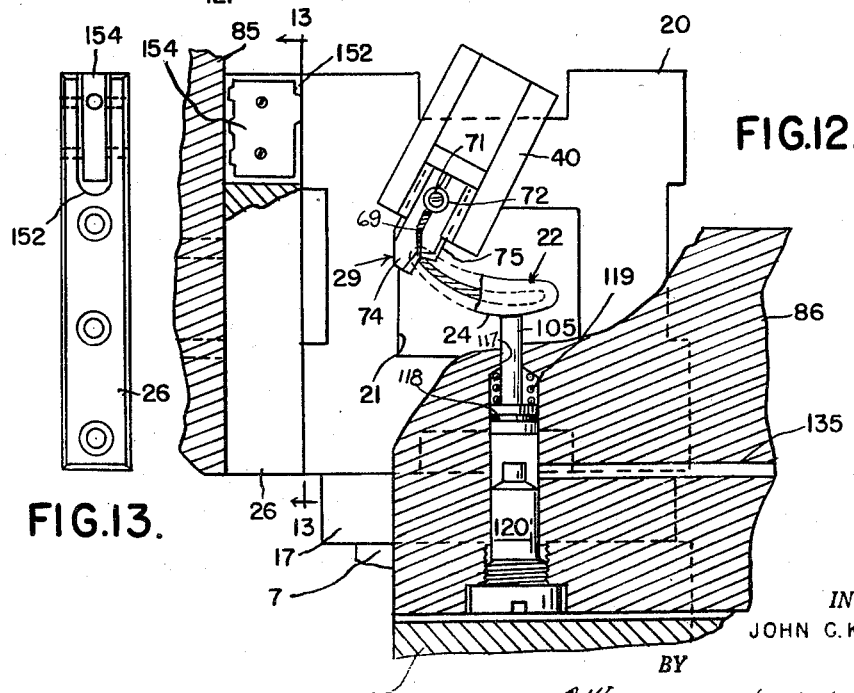
FIG.12.
FIG.13.
INVENTOR.
JOHN C. KELLY
BY 
ATTORNEYS

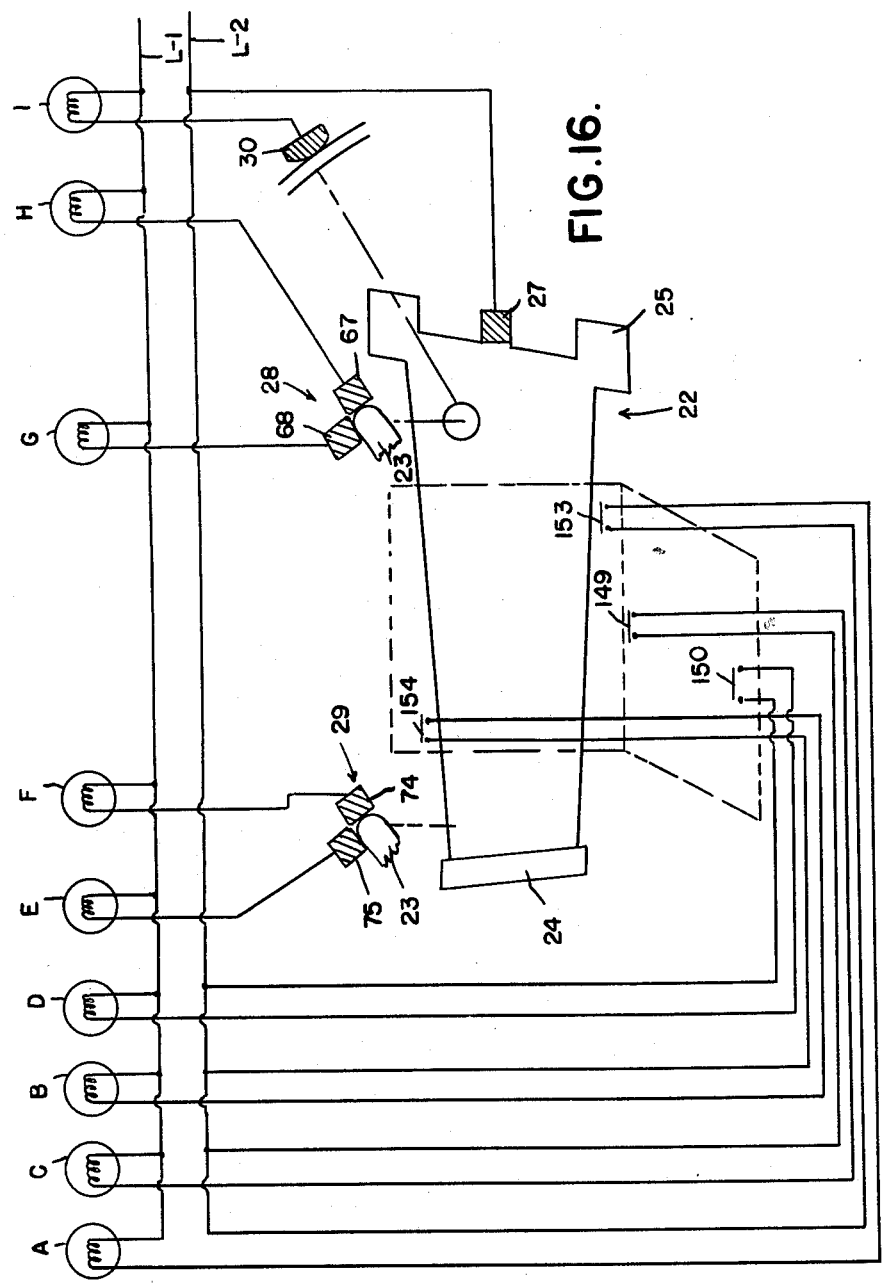

United States Patent Office 2,932,015
Patented Apr. 5, 1960

2,932,015

LOCATING FIXTURE AND METHOD

John C. Kelly, Jackson, Mich., assignor to Kelsey-Hayes Company, Detroit, Mich., a corporation of Delaware Application December 26, 1956, Serial No. 630,601

5 Claims. (Cl. 340—282)

This invention relates to a locating fixture and method.

The invention has for one of its objects to provide a method of checking location of points on any member by use of a low voltage circuit connected to lights or solenoids, the said member forming a part of the low voltage circuit.

The invention has for another object to provide a locating fixture and method for locating a member or workpiece with a high degree of accuracy.

The invention has for another object to provide a method for accurately locating an electrically conductive member in a predetermined position by closing an electric circuit to an electrically operated indicator through the member when the member is accurately located in its predetermined position to operate the indicator.

The invention has for still another object to provide apparatus for carrying out the method described above, including contacts engaged by the member when accurately located in its predetermined position to close a circuit through the member to an electrically operated indicator or signal device.

This invention has for a further object to provide a fixture for supporting a first member having a matrix cavity in a predetermined position, signal means for indicating when the matrix fixture is in its predetermined position, and means for supporting a second member in a predetermined position partly within the matrix cavity including electrical contacts engageable with the member to close a circuit to a signal device to indictae that the second member is in its predetermined position. Thereafter, a flowable composition may be poured into the matrix cavity and allowed to harden so that the second member is retained in a fixed accurately predetermined position relative to the first member. The first member may then be placed in suitable metal removing apparatus, for example, and certain projecting surfaces of the second member ground with a high degree of accuracy due to the accurate positioning of the second member in the matrix cavity of the first member. This procedure has been followed with excellent results in the manufacture of turbine vanes. If any dirt is present between the second member and one of the contacts, this will become apparent by reason of the fact that the circuit to the signal means will not be closed.

Other objects and features of the invention will become apparent as the description proceeds, especially when taken in conjunction with the accompanying drawings, illustrating preferred embodiments of the invention wherein:

Fig. 2 is a side elevational view of one side of the apparatus shown in Fig. 1.

Fig. 3 is a side elevational view of the other side of the apparatus.

Fig. 4 is a sectional view taken along the line 4—4 on Fig. 1.

Fig. 5 is a sectional view taken along the line 5—5 on Fig. 1.

Fig. 6 is a view partly in section and partly broken away, taken along the line 6—6 on Fig. 5.

Fig. 7 is a sectional view taken along the line 7—7 on Fig. 1.

Fig. 8 is a top plan view of the table for the matrix fixture.

Fig. 9 is an enlarged view of a portion of Fig. 2, with parts broken away and in section.

Fig. 10 is a sectional view taken along the line 10—10 on Fig. 9.

Fig. 11 is an enlarged view of a portion of Fig. 1, with parts broken away and in section.

Fig. 12 is an enlarged view of a portion of Fig. 3 with parts broken away and in section.

Fig. 13 is a view taken along the line 13—13 on Fig. 12.

Fig. 14 is a sectional view taken along the line 14—14 on Fig. 2.

Fig. 15 is a sectional view taken along the line 15—15 on Fig. 14.

Fig. 16 is a diagrammatic view including an electrical diagram.

Fig. 17 is a diagrammatic view of the pneumatic system.

Figure 1:
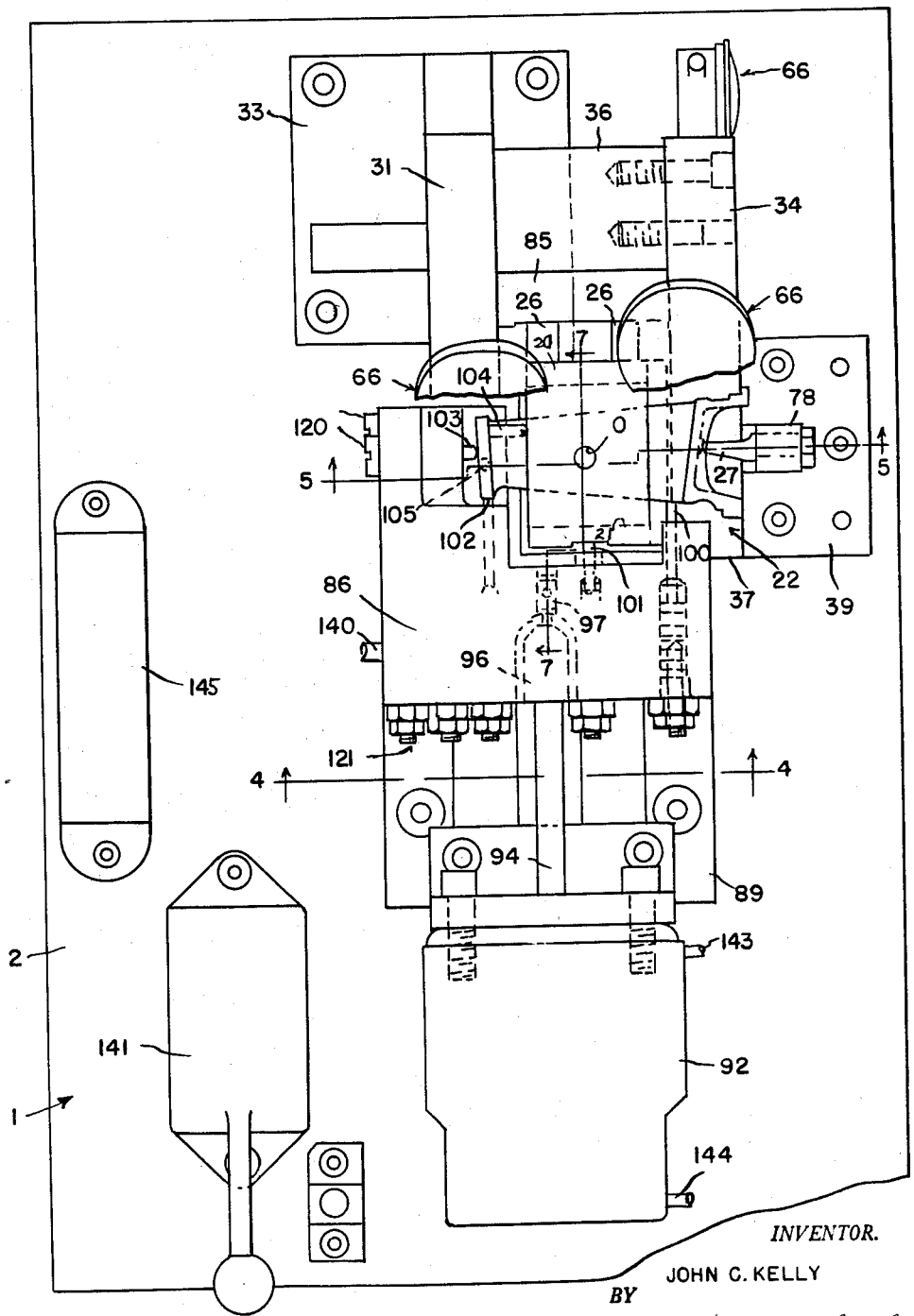
Fig. 1 is a top plan view of apparatus embodying the invention.

Referring now more particularly to the drawings, the fixture 1 has a horizontal base 2 and a stationary block 3 is secured to the top of the base. The block 3 has a dovetail track 4 (Figs. 4 and 6) projecting upwardly from the top, and the laterally spaced surfaces 5 at opposite sides of the track lie in a common plane and slant upwardly from front to rear of the fixture. The track 4 also slants upwardly from front to rear of the fixture, its top surface 6 lying in a plane parallel to the plane of the laterally spaced surfaces 5. A slide block 7 is supported on the stationary block 3 for forward and rearward sliding movement. The bottom surface 9 of the slide block has an undercut groove 10 extending from the front to the rear end of the slide block, and this groove receives the dovetail track to guide the sliding movement of the slide block. A filler strip 11, secured to slide block 7 within and at one side of groove 10 by set screws 12, is disposed in the space between the latter side and the adjacent side of the dovetail track to prevent looseness. The bottom surface 9 of the slide block has a sliding contact with the laterally spaced surfaces 5 of stationary block 3 so that the slide block slides along the inclined path provided by the stationary block.

The track 4 has an abutment 13 at the rear end engageable with the slide block to limit rearward movement of the latter. The dovetail track 4 also has a slot 14 in its top surface extending from the front end of the track to a point adjacent the rear end thereof, and a pin 15 carried by the slide block extends freely into this slot. A coil spring 16 is disposed in slot 14 and is compressed between the closed rear end of the slot and the pin to resist rearward movement of the slide block and cushion its engagement with abutment 13.

A table 17 is secured to the top of the slide block and has a generally horizontal supporting surface 18 and a retaining and locating wall 19 extending upwardly along one side of surface 18. The table 17 is adapted to support a matrix fixture 20 which will be seen to have a matrix cavity 21 extending through the matrix fixture from one side to the other. A pouring opening O in the top of the matrix fixture communicates with the matrix cavity. The fixture is also designed to support a member 22, which in the present instance is a turbine vane, in fixed position extending through the matrix cavity of the matrix fixture 20. The vane 22 shown semi-diagrammatically in Fig. 16, has an intermediate vane portion 23 and end portions 24 and 25, and the vane is formed of any suitable metal which is electrically conductive.

The matrix fixture 20 is adapted to be supported with its bottom resting on the surface 18 of table 17 and with one side abutting the retaining wall 19. The rear side of the matrix fixture abuts the vertically extending laterally spaced rails 26 which are rigidly carried by the fixture in a manner more fully described hereinafter. Means are provided for supporting and locating the vane in a predetermined position relative to the matrix fixture and extending through the matrix cavity, including the locators 27, 28, 29 and 30. The locator 27 (Figs. 1, 4, 5, 11 and 16) engages the end 25 of the vane, the locators 28 (Figs. 2, 5, 9 and 16) and 29 (Figs. 3, 5, 12 and 16) engage the rear edge of the intermediate vane portion 23 and the locator 30 (Figs. 2, 9 and 16) engages the bottom side of the intermediate vane portion. A locator support 31 (Figs. 1 and 3) rigidly secured to the base 2 extends upwardly from the base along one side of the table 17 and carries the locator adjustment device 32 associated with the locator 29. The support 31 has a mounting plate 33 at the bottom which is secured directly to the base. A second locator support 34 is provided for supporting the locator adjustment device 35 (Fig. 2) associated with locator 28. Support 34 is secured to the mounting plates 36 which are welded to and extend laterally from the support 31. The support 34 is located at the opposite side of the table 17 from support 31. The third locator support 37 is provided for supporting the locator adjustment device 38 (Fig. 2) associated with locator 30. The support 37 has a mounting plate 39 which is secured directly to the base 2 of the fixture.

The locator 28 is secured to an adjustment member 40 (Fig. 14) which is slidable in an undercut groove 41 along one side of the support 34. The adjustment member 40 has dovetail sides corresponding in shape to the sides of the groove, and a filler strip 43 is located within the groove 41 and secured to one of the undercut sides thereof by a set screw 44, the strip being located between the latter side of the groove and the adjacent side of the supporting member to take up looseness. A rod 45 is rigidly secured to the adjustment member 40 and extends from one end of the adjustment member longitudinally thereof. The free end portion of the rod is threaded, and a nut 46 is threadedly engaged upon the threaded portion of the rod. The nut 46 is an adjusting nut and is disposed within a recess 47 in the support 34. The recess 47 is cut away at 48 to clear the periphery of the adjusting nut and also to limit longitudinal movement of the adjusting nut. The adjusting nut 46 has a hub portion 49 which extends axially toward the adjustment member 40 from the knurled disk portion 50 of the nut, and the hub portion is received in the reduced portion 51 of a through passage in a block 52 rigidly carried by the support 34 within the recess 47. A lock nut 53 is also provided having a through passage which loosely embraces the rod 45 and having a hub portion 54 which extends into the enlarged portion 55 of the passage through the block 52, the hub being internally threaded and threadedly engaging the external threads on the hub portion of the adjusting nut 46. The recess 47 is also cut away at 56 to clear the knurled adjusting disk portion of the lock nut and also to limit longitudinal movement thereof. It will be apparent that rotation of the adjusting nut 46 will result in longitudinal movement of the rod 45 and adjustment member 40 depending upon the direction of rotation of the adjusting nut. Prior to turning the adjusting nut 46, the lock nut 53 is loosened. After the adjustment has been effected, the lock nut is rotated upon the adjusting nut to clamp the two nuts tightly against opposite sides of the block 52 to maintain the adjustment.

The free end of the rod 45 extends freely into a passage 58 in the support 34 and engages the reduced end 59 of a gage pin 60 (Fig. 2). The gage pin 60 is supported for longitudinal sliding movement within a passage 61 in gage block 62, the latter being rigidly secured to support 34 by bolts 63. The reduced end 59 of the gage pin projects into passage 58 in the support 34. The end of the gage pin opposite the reduced portion is beveled on a 45 degree angle for engagement with the similarly beveled end of gage pin 64 slidably supported in passage 65 within the gage block. Suitable gage mechanism 66 is provided for registering an indication of the setting of the locator 28 in accordance with the setting of the adjustment device 35 as transmitted to the gage by the beveled pins 60 and 64. Such gage mechanism is of conventional construction and forms no part of the present invention.

The support 31 supports the locator adjustment device 32 in substantially the same manner, and the device 32 is the same as the device 35 and accordingly the same reference numerals are employed. Likewise, the support 37 carries the locator adjustment device 38 in the same manner, and the adjustment device 38 is the same as the device 35 so that corresponding parts are identified by the same numbers. Gage mechanisms 66 are also associated with the adjustment devices 32 and 38.

The locator 28 (Fig. 9) is formed of two parts 67 and 68 which are secured to the support 40 to define a substantially right angle notch for receiving and engaging the rear edge of the vane portion 23 between the end 25 of the vane and the adjacent side of the matrix fixture 20 when the matrix fixture and vane are located on the fixture in their predetermined positions illustrated. The parts 67 and 68 are of electrically conductive material but are electrically insulated from one another by insulating paper 69 along their adjacent edges. Thus the parts 67 and 68 of the locator 28 are separate electrical contacts. The contacts 67 and 68 are clamped in a recess 70 (Fig. 10) of adjustment member 40 by a screw 71, the screw being separated from the contacts by an electrically insulating washer 72. Insulating paper 69 also separates the contacts from member 40.

The locator 29 is also composed of two separate parts 74 and 75 (Fig. 12). The parts 74 and 75 cooperate to define a notch engageable with the rear edge of the vane portion 23 between the end 24 of the vane and the adjacent side of the matrix fixture. The parts 74 and 75 are formed of electrically conductive material and are electrically insulated from one another and from the adjustment member 40 on which they are mounted by insulating paper. Thus the parts 74 and 75 are separate electrical contacts, and are secured to the adjustment member 40 by screw 71 and washer 72 in the same manner as contacts 67 and 68.

The locator 30 (see Fig. 9) is also formed of electrically conductive material and is engageable with the underside of the vane portion 23 between the end 25 of the vane and one side of the matrix fixture. The locator 30 is also an electrical contact and is electrically insulated from the adjustment member 40 on which it is mounted by insulating paper. Contact 30 is likewise secured to its adjustment member 40 by screw 71 and washer 72 as were the other contacts.

A post 78 (Figs. 1, 2, 5 and 11) is secured to the mounting plate 39 and extends upwardly therefrom and has a through passage 80 at its upper end. The shank 81 of the locator 27 extends within this passage and has a reduced threaded portion 82 projecting beyond the post. A nut 83 is threaded on the reduced portion 82 to draw up the shoulder 84 of the locator tight against the post to provide a rigid connection between the post and locator. The locator 27 is formed of a suitable electrically conductive material, is insulated from the post 78, and is adapted to engage the end 25 of the vane when the latter is supported on the fixture in its predetermined position.

The locators 27, 28, 29 and 30 determine the predetermined position of the vane, and the top surface of the table 17, the wall 19 and the rails 26 serve as locators to support and locate the matrix fixture 20 in a predetermined position. The rails 26 are rigidly secured to a plate 85 which is welded directly to the support 31.

Means are provided for urging the matrix fixture and the vane against their respective locators to locate them in their predetermined positions on the fixture 1. Such mechanism includes a slide 86 (Figs. 1, 2, 4, 5 and 11) having an undercut groove 87 (Fig. 5) on the bottom which slidably receives the horizontal dovetail track 88 projecting upwardly from the track plate 89 rigidly secured to the base 2. A filler strip 90 is secured to the slide 86 within the groove 87 between one of the converging sides of the groove and the adjacent converging side of the dovetail track to take up clearance. Set screws 91 are provided in the slide 86 for securing the filler strip in position relative thereto. A double acting cylinder 92 is provided for reciprocating the slide 86 in a forward and rearward direction along the track 88. The piston 93 of the double acting cylinder has a piston rod 94 connected thereto which is rigidly secured to the slide 86 to effect the reciprocation of the slide.

The track 88 is formed with a longitudinally extending recess 95 in its top surface which extends from the front end of the track to a point short of the rear end thereof.

A stop block 96 (Figs. 1 and 4) is carried by slide 86 within the groove 87 in a position to extend into the recess 95 during reciprocation of the slide. A stop pin 97 is threaded into a longitudinally extending tapped hole in the dovetail track 88, and the nose 98 of the stop pin projects through the open front end of the hole and into the recess 95 for engagement with the stop block 96 to determine the limit of rearward movement of slide 86.

The slide carries the abutment pins 100—105 (Figs. 1, 5, 11 and 12) which are provided to press the matrix fixture 20 and the vane 22 against their locators. The pins 100, 101 and 102 extend rearwardly and are slidably supported in horizontal passages 106, 107 and 108 in the slide. The passages have enlarged portions 109, 110 and 111 in which the piston heads 112 on the front ends of the pins are slidably received and have O-rings 113 to provide a fluid seal. The pins 103 and 104 extend horizontally and transversely of the direction of movement of the slide and are supported for sliding movement in passages 114 and 115. These pins 103 and 104 have piston heads 116 within the enlarged portions of the passages and also have O-ring seals. The pin 105 extends vertically and is slidable in a passage 117 in the slide. The pin 105 has a piston head 118 in the enlarged portion of passage 117 provided with an O-ring seal. Springs 119 urge the pistons of pins 100—105 inwardly relative to the slide. Plugs 120 close the passages 114, 115 and 117.

A fluid metering device 121 (Fig. 11) is provided in each of the passages 106, 107 and 108. Each fluid metering device comprises a tubular member 122 threaded into the rear end of the passage and having a hex-shaped end 123 to facilitate threading the tubular member into and out of threaded engagement in the associated passage. The longitudinal passage 124 within the tubular member has a reduced forward portion providing a valve seat 125. A needle valve 126 has an enlarged threaded outer end 127 for threaded engagement with the enlarged threaded portion of the passage 124 and has a reduced front end portion 128 engageable with the valve seat 125. The tubular member 122 is provided with an O-ring seal 129, and has a reduced annular portion 130 rearwardly of the seal formed with ports 131 for admitting fluid to the interior of the tubular member from the outside. The exposed rear end of the needle valve may be manually gripped to adjust the position of the needle valve relative to the valve seat 125 and thereby regulate or meter the flow of fluid past the valve and into the enlarged portion of passage 106 behind piston 112. Fluid enters the enlarged portion of passage 106 surrounding the reduced portion 130 of the tubular member 122 by a cross-passage 132 which interconnects the enlarged portions of passages 106—108.

Passages 133, 134 and 135 are provided, respectively communicating with the enlarged portions of passages 114, 115 and 117. The cross-passage 132 communicates directly with passage 133 and a vertical connecting passage 136 (Fig. 4) connects the cross-passage with the passage 134. The passage 135 communicates directly with the inlet passage 137 in turn connecting into the connecting passage 136. Metering devices 121 are also provided in the passages 133, 134 and 135 to meter the flow of fluid to the pins 103, 104 and 105. The cross-passage 132 and the connecting passage 136 are closed by caps 138 and the inlet passage 137 is adapted to be connected to a source of fluid under pressure by a conduit 140.

The pin 100 projects rearwardly from the passage 106 and is adapted to engage the front edge of vane portion 23 of the vane. The pin 101 projects rearwardly from the passage 107 and is adapted to engage matrix fixture 20. The pin 102 projects rearwardly from the passage 108 and is adapted to engage the end 24 of the vane. The pin 103 projects transversely from the passage 114 and is adapted to engage the end 24 of the vane. The pin 104 projects in the same direction as pin 103 and is adapted to engage the matrix fixture. The pin 105 projects upwardly for engagement with the end 24 of the vane.

A 4-way valve 141 (Fig. 17) is provided for controlling the reciprocation of the piston 93 in cylinder 92. The valve 141 is adapted to direct fluid such as air under pressure from the pump 142 to either of the lines 143 and 144 leading to opposite ends of the cylinder while exhausting the other. A 3-way valve 145 is provided for connecting the conduit 140 to fluid such as air under pressure from the pump 146 and to exhaust.

The slide 86 carries a button 147 (Fig. 6) at its rear end for engagement with the sliding support 7 for the matrix fixture. When the slide 86 is reciprocated in a rearward direction to its operative position, the button 147 engages the sliding support 7 to move it rearwardly and upwardly relative to the stationary support 3 to the position illustrated in Figs. 2 and 6. The button then holds the sliding support in this position against the action of the spring 16.

The table 17 has recesses 148 at the front and rear with normally open limit switches 149 and 150 (Figs. 7 and 8) secured in the recesses by the screws 151. The limit switches are engageable with and actuated by the matrix fixture resting upon the table.

The stop rails 26 have recesses 152 (Figs. 9, 12 and 13) and normally open limit switches 153 and 154 secured in the recesses. The stop rails are of identical construction but the recess and limit switch of one stop rail are at the upper end thereof while they are at the lower end of the other. The limit switches are engageable with and actuated by the matrix fixture when it engages the rails.

An electric circuit (Fig. 16) is provided having lines L-1 and L-2, shown in Fig. 16. The circuit to lamp A is controlled by limit switch 153, and the circuit to lamp B is controlled by limit switch 154. The circuit to lamps C and D are respectively controlled by limit switches 149 and 150. One lead to lamp E is connected to line L-1 and the other to contact 75 of locator 29. One lead to lamp F is connected to line L-1 and the other to contact 74 of locator 29. One lead of lamp G is connected to line L-1 and the other to contact 68 of locator 28. One lead of lamp H is connected to line L-1 and the other to contact 67 of locator 28. One lead of lamp I is connected to line L-1 and the other to contact locator 30. Line L-2 is connected to contact locator 27.

In use, the matrix fixture is placed on the table 17 with the turbine vane extending loosely through the matrix cavity thereof. The vane should be held in the matrix cavity by hand until clamped. Four-way valve 141 is then operated to move the slide 86 rearwardly to the operative position shown in the drawings. Thereafter, the 3-way valve 145 is operated to direct fluid under pressure from pump 146 through conduit 140 and into the passages of the slide to extend the pins 100—105. The pin 101 engages the front side of the matrix fixture and urges it rearwardly against the stop rails 26. Pin 104 engages the adjacent side of the matrix fixture and urges it against the retaining wall 19 of the table. Pin 100 engages the intermediate vane portion 23 to urge the vane rearwardly into engagement with the locators 28 and 29. The pin 102 engages the end portion 24 of the vane and likewise urges it rearwardly. The pin 105 urges the end portion 24 of the vane upwardly to assist the pins 100 and 102 in engaging the rear edge of the intermediate vane portion in the notches defined by the locators 28 and 29. The pin 103 urges the vane transversely of the fixture and into engagement with the locator 27.

Since the vane is formed of a suitable electrically conductive metal, it is apparent that when the locator contacts 27 and 30, and the contacts 67 and 68 of locator 28 as well as the contacts 74 and 75 of the locator 29 engage the vane, the signal lights E—I will be energized to indicate that the vane is properly located on the fixture. The signal lights A—D will be energized by the limit switches 149, 150, 153 and 154 closed by the matrix fixture supported in proper position on the table with its rear side abutting rail 26.

The signal lights A—I indicate that the matrix fixture and vane are accurately predeterminedly positioned relative to the fixture 1 and to each other. The vane may now be fixed in this predetermined position relative to the matrix fixture by pouring a suitable molding material into the matrix cavity of the matrix fixture through the opening O therein. A suitable molding material is "Cerro-Bend" which is a low melting point alloy containing approximately 25% lead, 25% tin and 50% bismuth. The open ends of the matrix cavity are of course sealed closed during the pouring and hardening of the "Cerro-Bend" by suitable end clamps shaped to clear the portions of the vane projecting beyond the cavity. Such clamps are not shown since they are not involved in the invention claimed herein. After the "Cerro-Bend" has hardened, the 3-way valve 145 is reversed to release the pressure on pins 100—105, retracting the layer, and 4-way valve 141 is reversed to retract the slide 87 forwardly from the position shown. The spring 16 will then urge the table supporting slide block 7 forwardly and downwardly along the inclined track provided by stationary block 3 into limiting engagement with track plate 89 in which position the matrix fixture and vane assembly may be readily removed from fixture 1.

Any dirt or other impurity between the vane and one of the contacts will be readily apparent by reason of the fact that the circuit to the associated lamp will not be closed. Moreover, the electrical contacts 27, 30, 67, 68, 74 and 75 are rigidly supported, and no movement thereof is required to energize the associated lamps E—I, it being only required that the vane 22 engage these contacts. Accordingly the vane is very accurately positioned.

The electric circuit is a low voltage circuit. No arcing between the vane 22 and the electrical contacts will take place, but instead the vane must actually engage the contacts to close the circuit.

What I claim as my invention is:

1. A fixture for accurately locating an electrically conductive member in a predetermined position comprising a frame, spaced locators on said frame engageable with the member to locate it in said predetermined position, means for applying a continuous pressure against the member to hold it against said locators in said predetermined position, said locators and pressure applying means opposing one another and cooperating to securely and positively position the member, said locators including spaced electrical contacts, a plurality of electrical circuits each including two of said contacts, and an electrically operated signal device in each circuit, said circuits being closed through the electrically conductive member when located in said predetermined position in engagement with said contacts to operate said signal devices.

2. A fixture for accurately locating an electrically conductive member in a predetermined position comprising a frame, spaced locators on said frame engageable with the member to locate it in said predetermined position, fluid pressure means for applying a continuous pressure against the member to hold it against said locators in said predetermined position, said locators and fluid pressure means opposing one another and cooperating to securely and positively position the member, said locators including spaced electrical contacts, a plurality of electrical circuits each including two of said contacts, one contact being common to each circuit, and an electrically operated signal device in each circuit, said circuits being closed through the electrically conductive member when located in said predetermined position in engagement with said contacts to operate said signal devices.

3. A fixture for accurately locating an electrically conductive member in a predetermined position at least partly in the matrix cavity of a second member comprising frame structure, means for supporting the second member on said frame structure in predetermined position, spaced locators on said frame structure engageable with the electrically conductive member to locate it in its predetermined position at least partly in the matrix cavity of the second member, means for applying a continuous pressure against the electrically conductive member to hold it against said locators in said predetermined position, said locators and pressure applying means opposing one another and cooperating to securely and positively position the electrically conductive member, said locators including spaced electrical contacts, a plurality of electrical circuits each including two of said contacts, and an electrically operated signal device in each circuit, said circuits being closed through the electrically conductive member when located in said predetermined position in engagement with said contacts to operate said signal devices.

4. A fixture for accurately locating an electrically conductive member in a predetermined position at least partly in the matrix cavity of a second member comprising frame structure, locating means on said frame structure engageable with the second member to locate it in a predetermined position, fluid pressure means for applying a continuous pressure against the second member to hold it against said locating means in its predetermined position, said locating means and fluid pressure means opposing one another and cooperating to securely and positively position the second member, switch means actuated by the second member when it is located in its predetermined position in engagement with said locating means, signal means operated by said switch means, spaced locators on said frame structure engageable with the electrically conductive member to locate it in its predetermined position at least partly in the matrix cavity of the second member, fluid pressure means for applying a continuous pressure against the electrically conductive member to hold it firmly against said locators in its predetermined position, said locators and fluid pressure means opposing one another and cooperating to securely and positively position the electrically conductive member, said locators including spaced electrical contacts, a plurality of electrical circuits each including two of said contacts, one contact being common to each circuit, and an electrically operated signal device in each circuit, said circuits being closed through the electrically conductive member when located in its predetermined position in engagement with said contacts to operate said signal devices.

5. A fixture for accurately locating an electrically conductive member in a predetermined position at least partly in the matrix cavity of a second member comprising frame structure, a table for supporting the second member slidably mounted on said frame structure for movement to and from an operative position, a stop for locating said table in its operative position, a slide mounted on said frame structure, means for moving said slide toward said table to move the latter to its operative position against said stop, spaced locators on said frame structure engageable with the second member on said table to locate it in a predetermined position when said table is in its operative position, fluid pressured operated plungers carried by said slide for applying a continuous pressure against the second member on said table to hold it against said locators in its predetermined position, said locators and plungers opposing one another and cooperating to securely and positively position the second member, switch means actuated by the second member when it is located in its predetermined position in engagement with said locators, signal means operated by said switch means, additional spaced locators on said frame structure engageable with the electrically conductive member to locate it in its predetermined position at least partly in the matrix cavity of the second member when the latter is in its predetermined position, additional fluid pressure operated plungers carried by said slide for applying a continuous pressure against the electrically conductive member to hold it against said additional locators in its predetermined position, said additional locators and additional plungers opposing one another and cooperating to securely and positively position the electrically conductive member, said additional locators including spaced electrical contacts, a plurality of electrical circuits each including two of said contacts, one contact being common to each circuit, and an electrically operated signal device in each circuit, said circuits being closed through the electrically conductive member when located in its predetermined position in engagement with said contacts to operate said signal devices.

References Cited in the file of this patent

UNITED STATES PATENTS

| | | |
|---|---|---|
| 2,166,404 | Hait | July 18, 1939 |
| 2,256,120 | Lovenston | Sept. 16, 1941 |
| 2,419,417 | Omel | Apr. 22, 1947 |
| 2,607,834 | Connors | Aug. 19, 1952 |
| 2,724,110 | Larsen | Nov. 15, 1955 |
| 2,788,255 | Farber | Apr. 9, 1957 |